Figure 1:
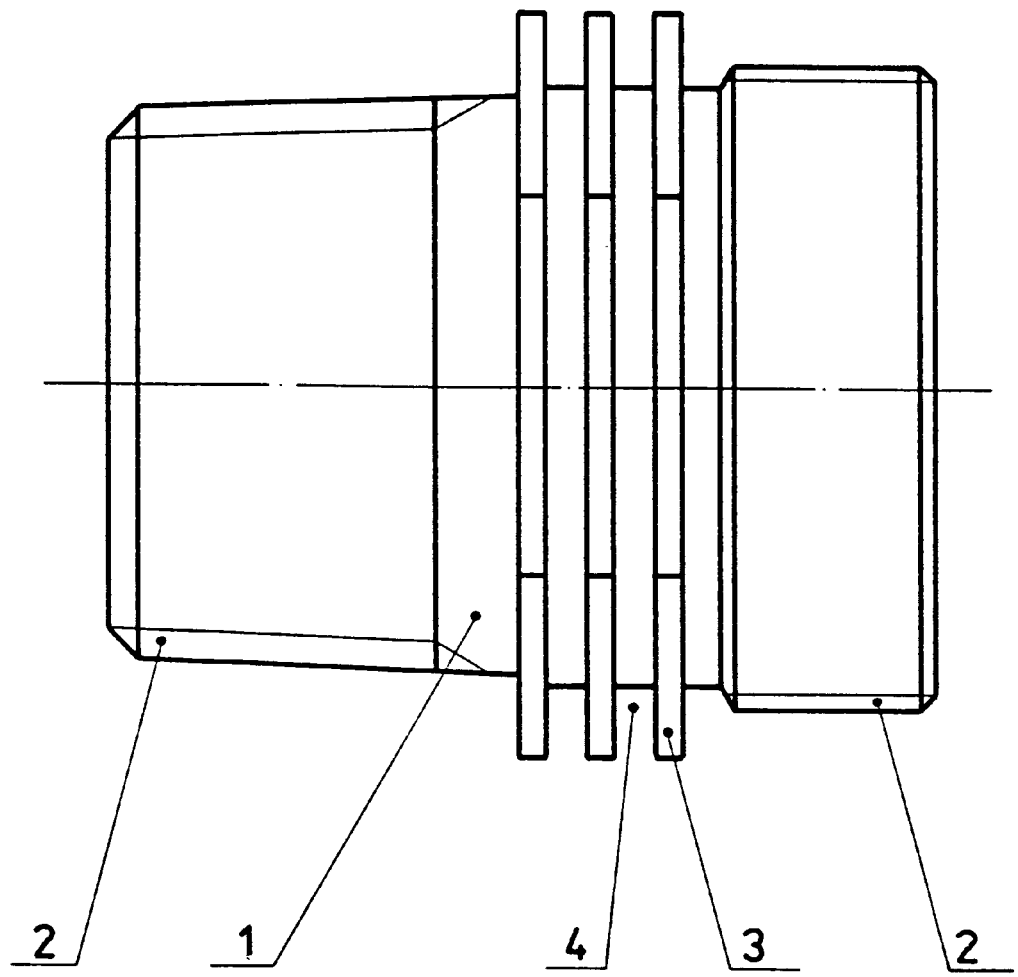

United States Patent

Schulze

[11] Patent Number: 5,950,656
[45] Date of Patent: Sep. 14, 1999

[54] THERMAL SAFETY FITTING FOR AUTOMATICALLY SHUTTING DOWN FLUID LINES

[75] Inventor: Klaus Schulze, Gernrode, Germany

[73] Assignee: Mertik Maxitrol GmbH & Co., KG, Germany

[21] Appl. No.: 09/131,093

[22] Filed: Aug. 7, 1998

Related U.S. Application Data

[62] Division of application No. 08/765,376, Dec. 20, 1996, Pat. No. 5,836,338.

[30] Foreign Application Priority Data

Jun. 24, 1994 [DE] Germany .............................. 44 22 241

[51] Int. Cl.⁶ ................................................... F16K 17/38
[52] U.S. Cl. ................................................. 137/74; 137/75
[58] Field of Search .......................................... 137/75, 74

[56] References Cited

U.S. PATENT DOCUMENTS

| | | | |
|---|---|---|---|
| 466,022 | 12/1891 | Rice | 137/75 |
| 878,658 | 2/1908 | Murray | 137/75 |
| 2,048,387 | 7/1936 | Johnsen | 137/74 X |
| 2,225,880 | 12/1940 | Montelius | 137/538 X |
| 2,630,818 | 3/1953 | McRae | 137/75 |
| 2,630,822 | 3/1953 | Davies . | |
| 2,707,965 | 5/1955 | Allen . | |
| 3,366,138 | 1/1968 | Graham . | |
| 3,537,518 | 11/1970 | Sullivan et al. | 137/75 X |
| 3,659,624 | 5/1972 | Kelly . | |
| 3,720,220 | 3/1973 | McMath . | |
| 3,802,510 | 4/1974 | Johnson . | |
| 3,842,853 | 10/1974 | Kelly et al. | 137/75 |
| 4,263,839 | 4/1981 | Akkerman . | |
| 4,442,756 | 4/1984 | Goans . | |
| 4,488,566 | 12/1984 | Hicks . | |
| 4,625,762 | 12/1986 | Hassanzadeh et al. | 137/75 X |
| 4,890,635 | 1/1990 | Gray . | |
| 5,004,003 | 4/1991 | Gray . | |
| 5,275,194 | 1/1994 | Gray . | |
| 5,477,877 | 12/1995 | Schulze et al. . | |
| 5,743,285 | 4/1998 | Shalkevich | 137/74 |

FOREIGN PATENT DOCUMENTS

| | | |
|---|---|---|
| 0 118 152 | 9/1984 | European Pat. Off. . |
| 0 257 484 | 3/1988 | European Pat. Off. . |
| 0 364 906 A2 | 4/1990 | European Pat. Off. . |
| 0 343 615 B1 | 7/1993 | European Pat. Off. . |
| 0 574 677 A1 | 12/1993 | European Pat. Off. . |
| 1019879 | 4/1958 | Germany . |
| 1429056 | 6/1971 | Germany . |
| 33 44 704 A1 | 6/1985 | Germany . |
| 31 26 213 C2 | 12/1986 | Germany . |
| 39 16 100 A1 | 11/1990 | Germany . |
| 90 17 534 U | 5/1991 | Germany . |
| 536051 | 5/1941 | United Kingdom . |
| 549406 | 11/1942 | United Kingdom . |
| 838087 | 6/1960 | United Kingdom .................. 137/75 |
| WO 93/06397 | 4/1993 | WIPO . |

*Primary Examiner*—John Rivell
*Assistant Examiner*—Ramyar Farid
*Attorney, Agent, or Firm*—Harness, Dickey & Pierce, P.L.C.

[57] ABSTRACT

The invention concerns a thermal safety fitting in which the closure motion of the obturator is longitudinal with respect to the obturator seat. The aim is to avoid lateral excursions of the obturator, while keeping manufacturing costs and structural size as low as possible. The obturator (12) is held in the open position in the housing (1) on the longitudinal axis of the obturator seat (28) by means of a generally U-shaped element (30). The two arms (9) of the U-shaped element (30) are located in the vicinity of a reduced-diameter section (17) of the obturator (12). The part (13) of the U-shaped element (30) joining the two arms (9) rests against a thermosolder (14). If the thermosolder (14) melts, the arms (9) no longer remain in the reduced-diameter section (17) owing to the change in the position of the U-shaped element (30), and the obturator (12) thus moves into the closed position under the action of a closing spring (24).

7 Claims, 7 Drawing Sheets

THERMAL SAFETY FITTING FOR AUTOMATICALLY SHUTTING DOWN FLUID LINES

This is a division of U.S. patent application Ser. No. 08/765,376, filed Dec. 20, 1996 now U.S. Pat. No. 5,836,338.

TECHNICAL AREA

The invention concerns a thermal safety device for sealing conduits, especially gas conduits, at the occurrence of an undue rise in temperature according to the introductory part of the first patent claim.

STATE-OF-THE-ART

There are a number of forms of construction of such thermal safety devices which are installed in conduits as for example before gas fittings, gas equipment, gas meters etc. Their purpose is to interrupt gas supplies, when rises in temperature take place, before the temperature in the named gas equipments becomes so high that their external gas-tightness is endangered.

Thus a so-called fire protection valve is known from WO 93/06397 with locking spring for the automatic sealing of conduits. In this fire protection valve, a metal closure body is arranged in a housing, which has a spherical form in the sealing area with which it lies, in the open position, on three fixed points formed by two spheres and a temperature sensitive component, due to the force of a locking spring. Thereby the two spheres, which themselves are supported on a step in the housing, are displaced from each other such that they form an opening angle of approximately 90°. The temperature sensitive component is attached to the inner wall of the housing opposite this opening angle.

This consists of an inwards opening recess which is attached to the inner wall by its base. Inside the radially inwards opening recess, there is a meltable body into which a sphere is pressed and which forms a clearance fit with the recesses opening. This makes up the third fixed point and is dimensioned such that it is almost completely within the recess when the meltable body is not in place. The seat diameter, formed by the three fixed points, for the metal closure body is thus dimensioned such that the closure body, if the sphere is located within the recess, is pressed through the resulting enlarged opening between the three fixed points due to the effective force of the locking spring.

As can be very well recognized in the corresponding FIG. 1, this solution is disadvantageous in that the eccentrically supported closure body is not axially guided in performing its closure movement. On account of the always incomplete axial working force direction of the locking spring, due to the given tolerances, the closure movement of the spheres results in their sideways deviation. The compulsorily resulting impact and the therefore necessary centering movement in the seat use part of the kinetic energy required to achieve a force fit. This force fit is necessary however, if the thermal safety device should also still be effective at temperatures at which the locking spring already has no force.

A similar solution is also described in EP-OS 574 677. With this safety gas socket, a retaining ring is supported within the housing, in or upon which an axially symmetric closure component rests, whose largest external diameter is only a little larger than that of the inner diameter of the retaining ring. Thereby the closure component is pressed by a spring element against the retaining ring in the direction of a sealing seat. The retaining ring consists of a material, which at a particular pre-determined temperature, softens so much that the closure component is pressed through the retaining ring by the spring element and in connection with a seat, blocks the gas flow.

Although with this solution an axial seating in the open position is achieved, due to the lack of axial guidance of the sphere, this solution can also not prevent the sideways deviation of the closure body as described above and its corresponding disadvantage as already mentioned.

A further thermal safety device with the same disadvantage is given in DE-GM 90 17 534. In this version, a pre-tensioned sealing ball is arranged in the housing with a retaining bolt against a compression spring. Whilst the retaining bolt is attached at one end to the sealing ball, it is supported at its other end, the diameter of which is enlarged, on a meltable body, the retaining bolt protruding through its axial opening.

A similarly constructed device for sealing conduits, which is described in DE-OS 39 16 100, attempts to overcome this disadvantage in that the retaining bolt is held axially by means of a separate guidance component. Hereby it is disadvantageous in that together with the additional component, higher production requirements are necessary. In order to guarantee sufficient guidance, construction size is increased.

DESCRIPTION OF THE INVENTION

The invention takes as its basis the problem of developing a thermal safety device by which the closure movement of the closure body is axially guided to the seat. Thereby the guidance should cause only a minimal flow resistance. Manufacturing costs and constructional size are to be held as low as possible.

According to the invention, the problem is solved in that, a closure body, located in the housing in the axial extension within its seat, is held in the open position by at least one somewhat U-shaped bent component. For that purpose, the closure body connected to the sealing area facing the seat has a recess on its side averted from the seat, on which it connects to a preferably cylindrical collar. The two shanks of the bent component are located in the area of the recess and thus form a seat for the collar against the force of the locking spring. The part of the bent component connecting the two shanks is further supported by a meltable body which itself lies on the inner wall of the housing. When the meltable body melts away, the shanks of the bent component are no longer in the recess of the closure body due to the corresponding change of position of the bent component in the housing such that the closure body can take up its closed position due to the effect of the locking spring. Thereby the shanks each form a guide track directed at the seat for the collar and/or the sealing area of the closure body.

Thus a solution has been found which eliminates the hitherto disadvantage of the state-of-art, the inexact running axial closure movement of the closure body, and which is characterized above all by its simplicity.

In order to guarantee good guidance of the closure body, instead of one bent component, two U-shaped bent components opposite each other can be utilized for example. Thereby it is sufficient if only one bent component is supported on the meltable body whilst the other bent component lies directly on the inner wall of the housing. Further it is possible to replace one of the two U-shaped bent components by an I-shaped bent component also supported on the inner wall, which is then self-evidently arranged axially opposite the U-shaped bent component. Also one of the two bent components can in addition have a seat for the locking spring, or the two bent components can even be connected in one piece with each other whereby the connecting flange can simultaneously serve as a seat for the locking spring.

Further advantageous refinements of the invention can be taken from the other patent claims. Thus it is shown to be especially advantageous if the bent component holding the closure body in the open position is formed by a somewhat U-shaped bent clip. The two sprung shanks of the clip, which otherwise are supported on the inner wall of the housing by their outward radially angular ends, are located partially in the recess area. When the meltable body melts away, the clip's shanks spread apart, due to diameter enlargement resulting from the changed position, so far that the closure body takes up its closed position due to the effect of a locking spring.

In order that the construction size of the thermal safety device can be additionally further reduced, the locking spring, as described above, should support itself on the bent component or clip with its side averted from the closure body.

An especially favourable solution is given if, in addition to the U-shaped bent component, a flat-plate I-shaped bent component is arranged in the housing. Thereby the locking spring is supported on one shank of the bent component, which itself is supported by a seat in the housing, whilst the other shank forms a further guide track directed at the seat for the closure body.

Further it shown to be advantageous if the closure body has a groove on its side averted to the seat which almost completely accommodates the locking spring in the tensioned position. Thereby the groove's depth should be favourably determined such that the frontal area of the groove, serving to support the locking spring, is located within the area of the sealing surface at the outer circumference of the closure body. Because the contact point of the locking spring is beneath the clip's retaining area, an additional negative influence of the sealing procedure, especially due to tolerances determined by manufacturing, the possible inclined position of the closure body and also due to tilting of the closure body in the open position, is avoided. Furthermore it is possible to reduce the constructional length of the thermal safety device by accommodating the locking spring to its greatest part within the groove.

FORM OF CONSTRUCTION

The invention is described in detail in the following form of construction. There is:

FIG. 1 a thermal safety device (according to the invention)

Figure 2:
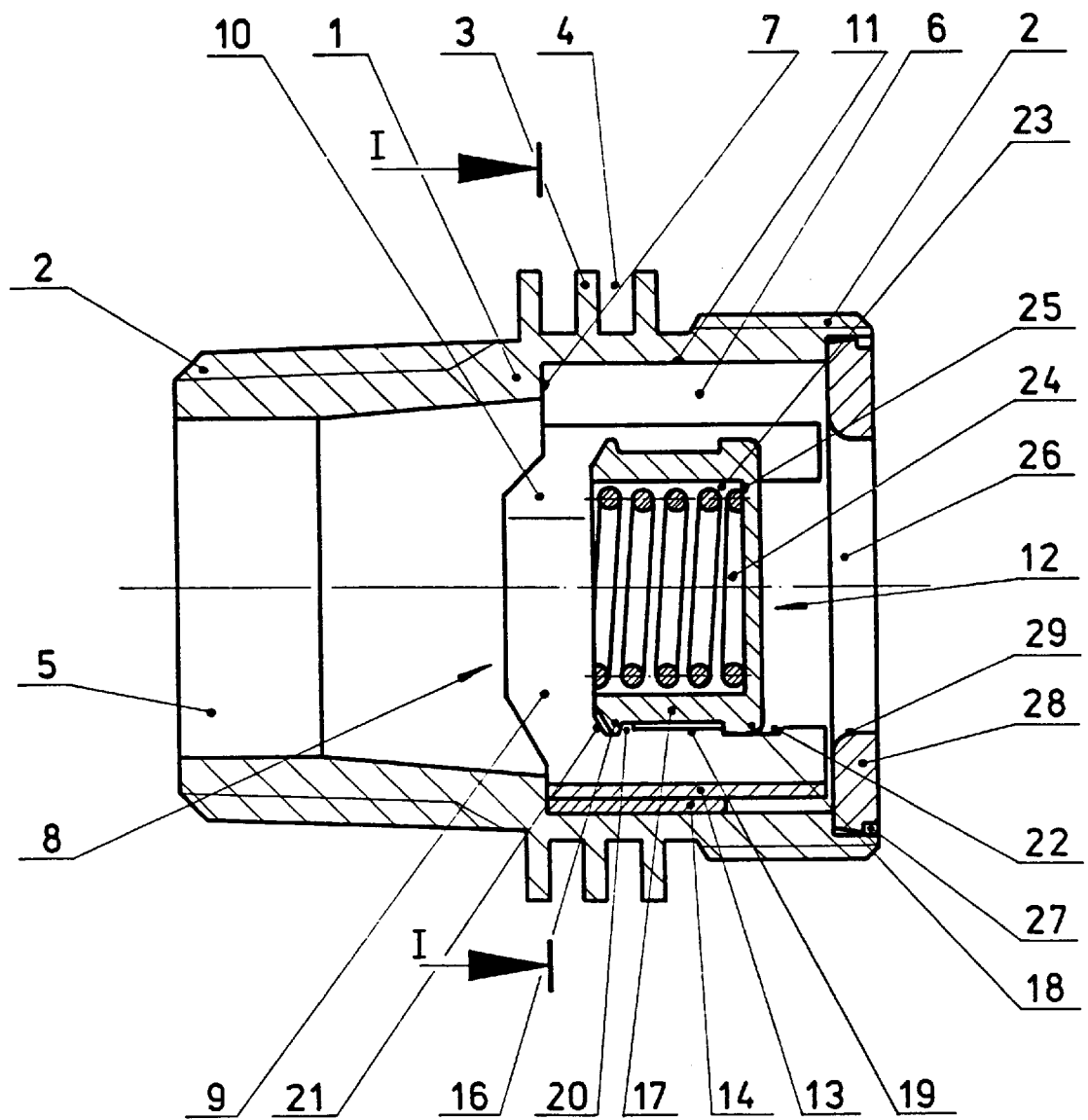
Figure 3:
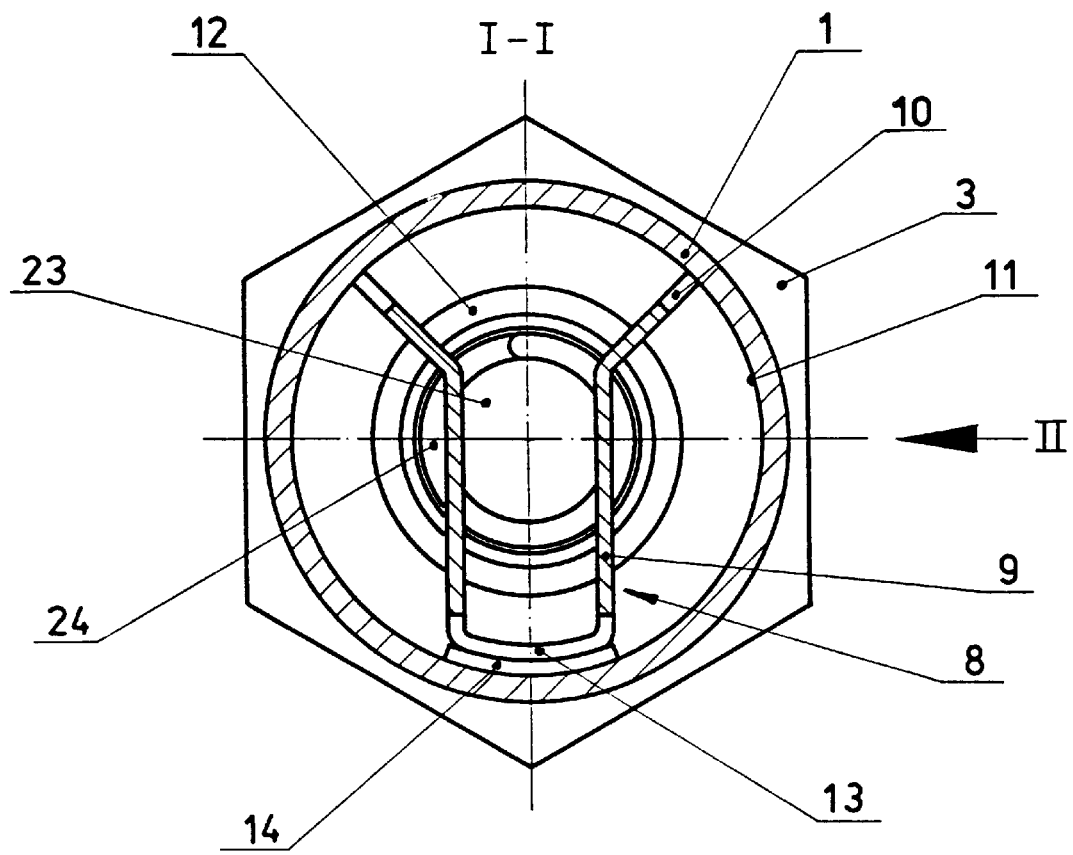
Figure 5:
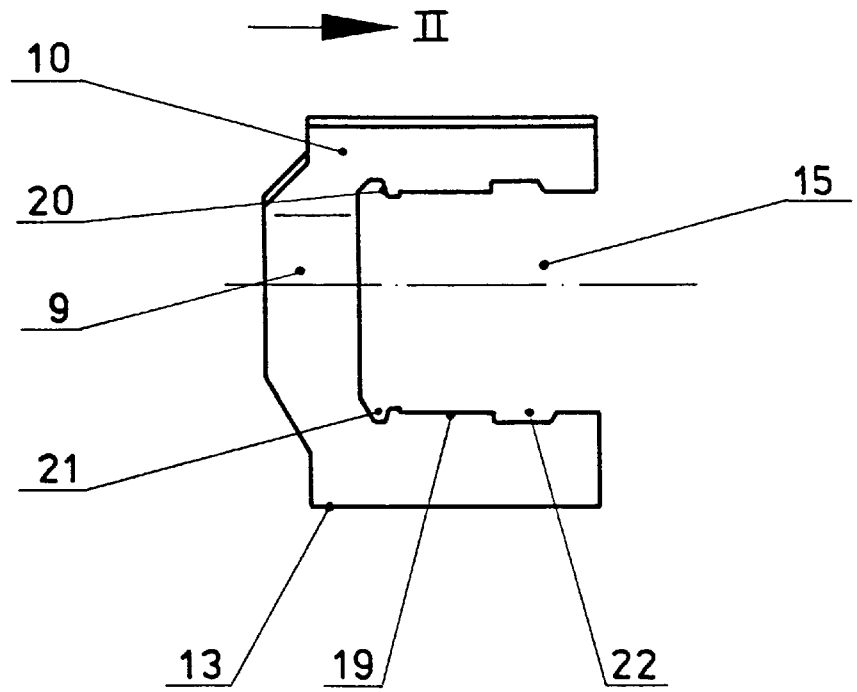
Figure 4:
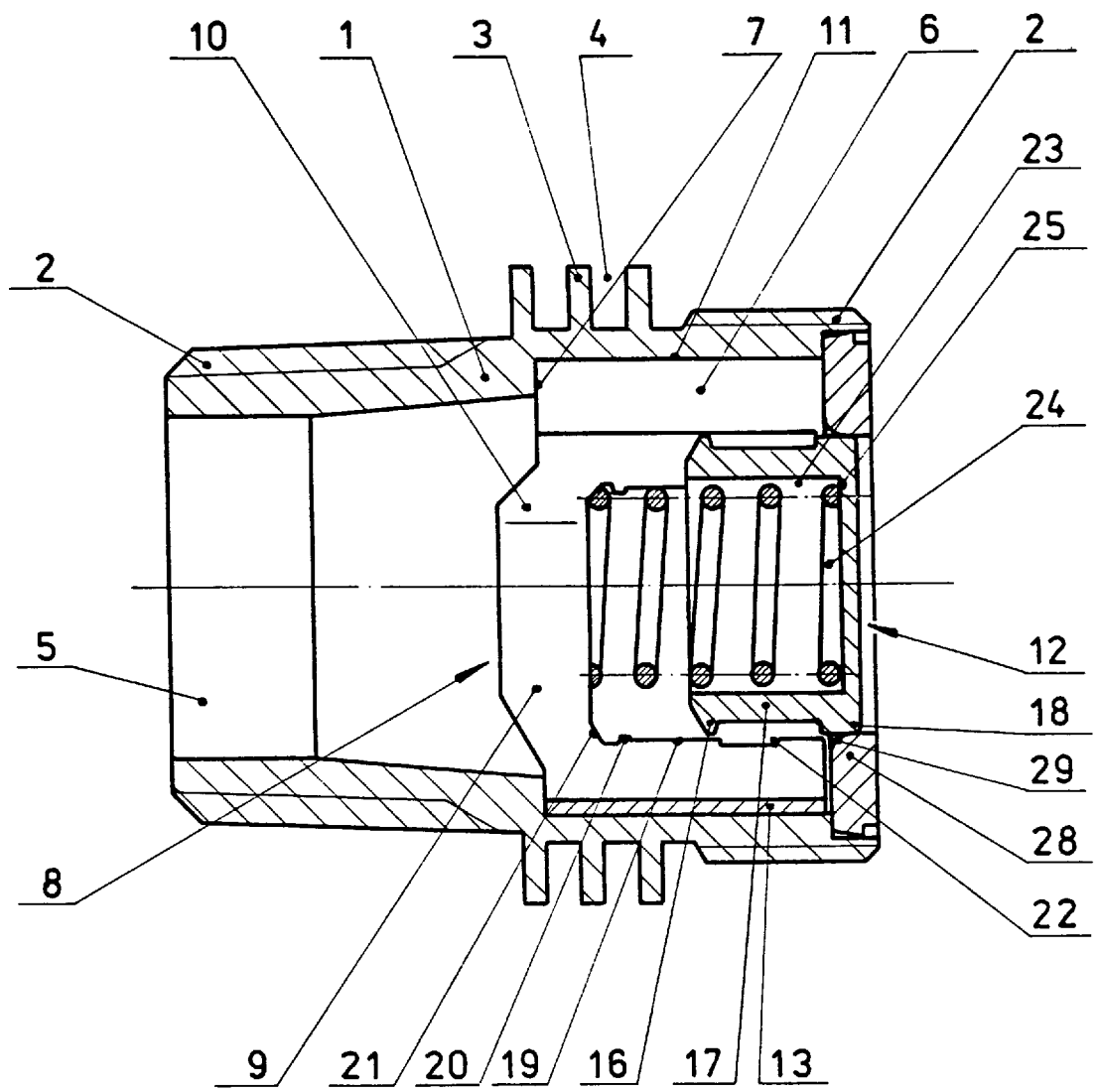

FIG. 2 a thermal safety device (according to the invention) in the open position, sectional view FIG. 3 a plan view of FIG. 2, section A—A FIG. 4 a thermal safety device (according to the invention) from FIG. 2 in the closed position, sectional view FIG. 5 a drawing of the clip, plan view B from FIG. 3

Figure 6:
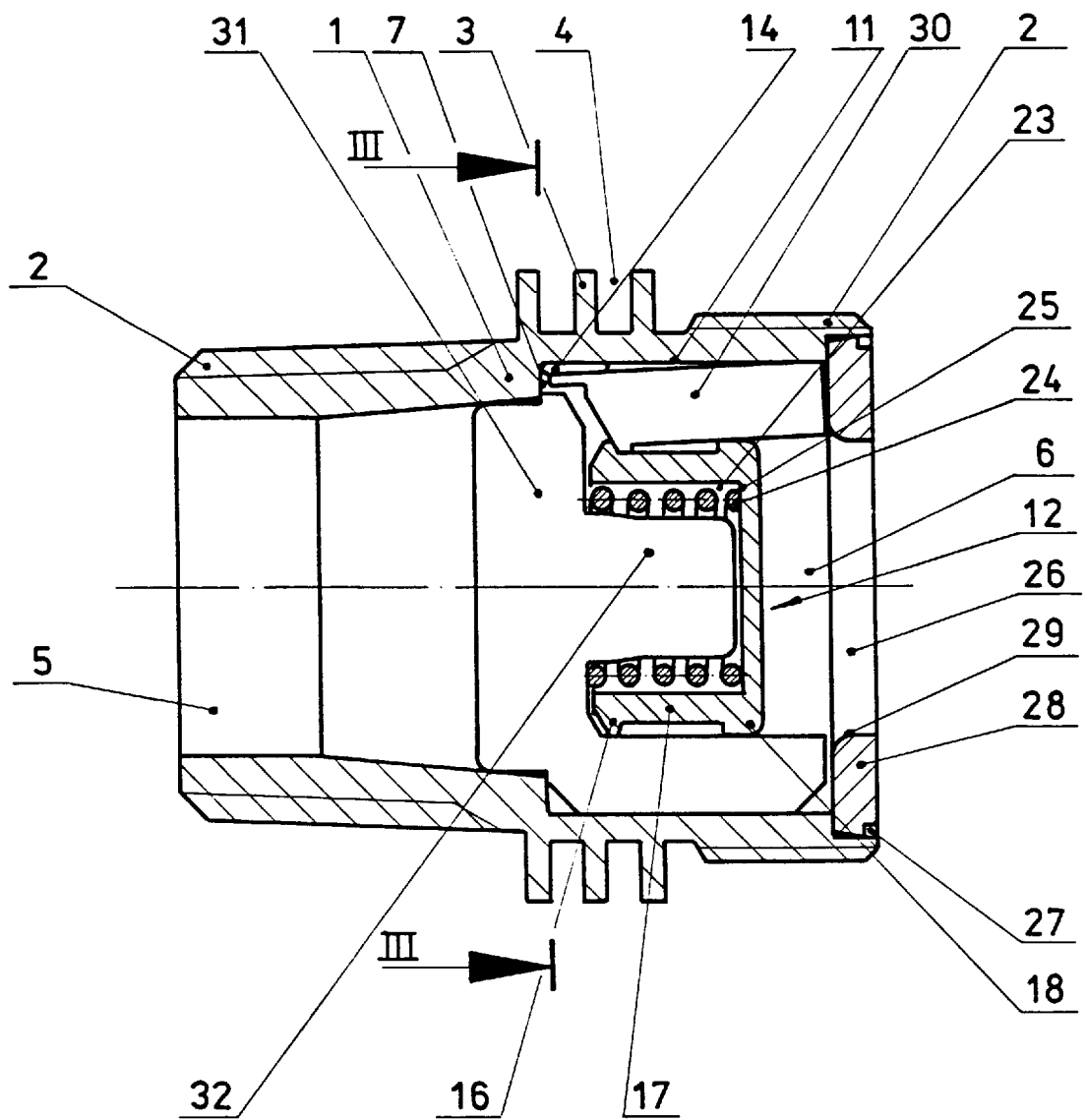
Figure 7:
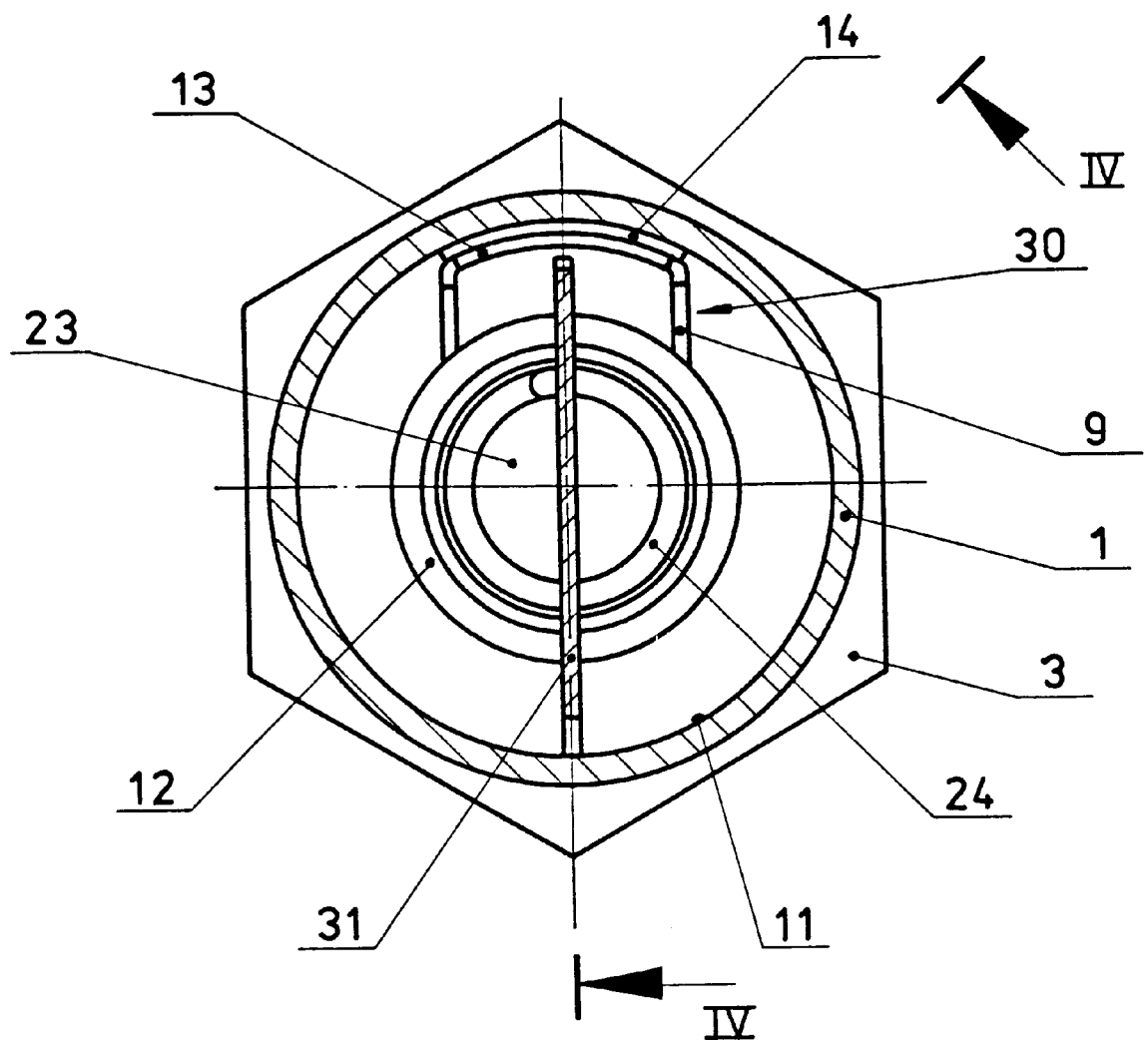

FIG. 6 a further thermal safety device (according to the invention) in the open position, sectional view D—D from FIG. 7

FIG. 7 a plan view of FIG. 6, section C—C

Figure 8:
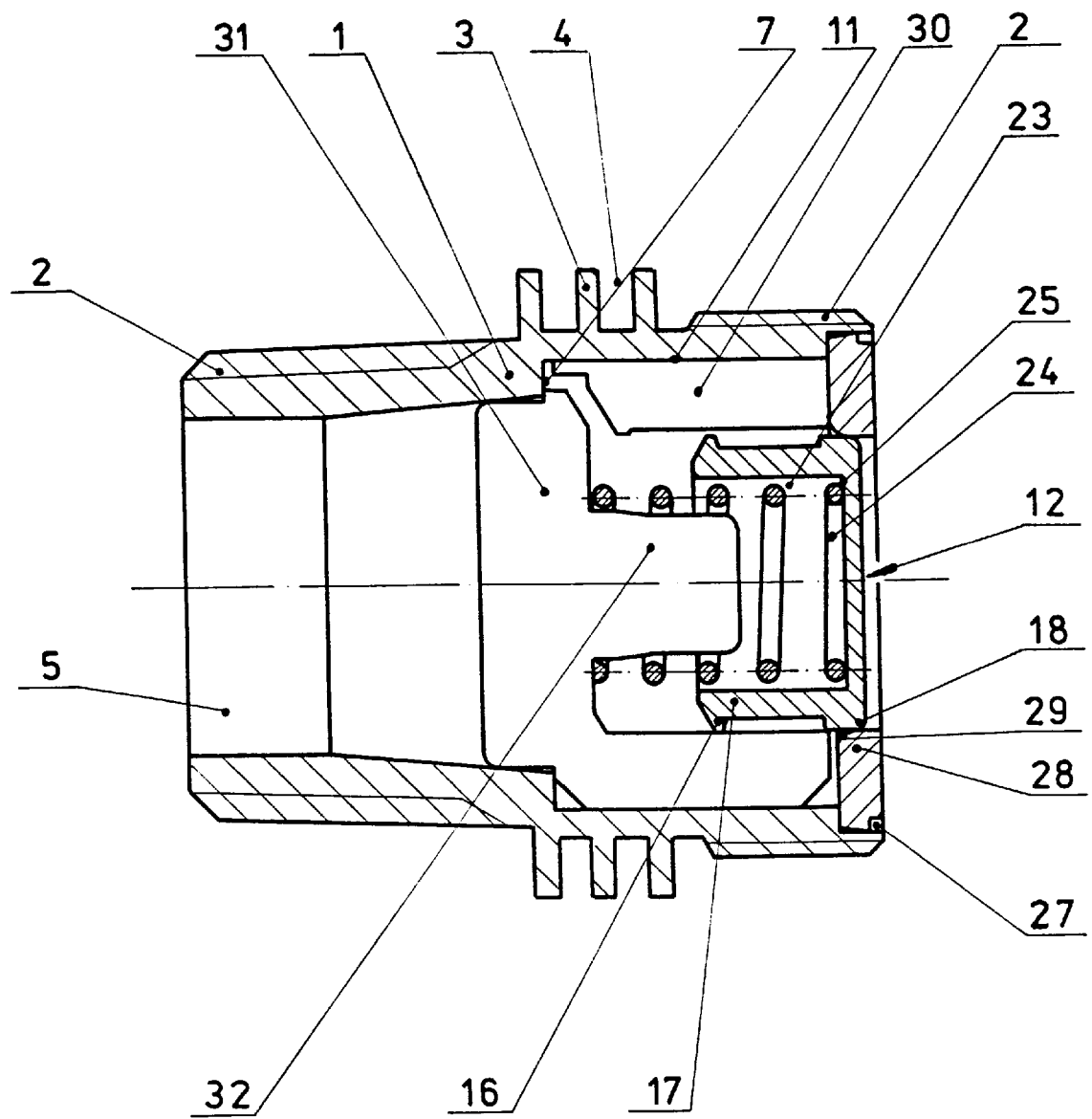

FIG. 8 a thermal safety device (according to the invention) in the closed position, sectional view D—D from FIG. 6

The thermal safety device, according to the invention, shown in FIG. 1 has a tubular shaped housing (1) having a connector and both its ends which in this case are shown as an outer threads. It is self-evident that another connector is also possible. Between the two connector threads (2), housing (1) has an external hexagonal head (3) for use by a spanner or similar tool when being installed in a gas conduit (not shown). In order to increase the surface area of hexagonal head (3), the hexagonal head (3), which is also additionally coloured black, is provided with grooves about its circumference hereby achieving the beat possible heat transfer to the interior of the thermal safety device.

The thermal safety device shown in FIG. 1 is now shown in a sectional view in FIG. 2 in the open position.

In the elongation of the expanding intake (5), a tubular shaped extension (6) is connected in housing (1) for reasons of inflow technique. A somewhat U-shaped bent clip (8) lies on the first seat formed by intake (5) and extension (6), which has both its shanks (9), preferably having radially angular ends (10) sprung against the inner wall (11) of housing (1), splayed out. (See FIG. 3). Thereby it is more favourable to select an opening angle of approximately 90° for the two angular ends (10). The clip (8) is made of plate as a bent component and its surfaces run parallel to the housing axis lying in the flow direction and thus parallel to the inner wall (11) of housing (1). Thereby only a minimal flow resistance is produced by clip (8). A locking spring (24), arranged axially in housing (1) is supported by both shanks (9) of clip (8) and otherwise protrudes into closure body (12) which will be explained in detail below. Between the fixed part (13) connecting the two shanks (9) of clip (8) and the inner wall (11), there is a lamellar component comprised of meltable body (14) which is pressed against the inner wall (11) by clip (8).

As can be seen from FIG. 5, the two shanks (9) of clip (8) have a open somewhat U-shaped recess (15) in the flow direction. Thereby both recesses (15) are arranged symmetrically to each other whereby the area of the bent edge of each shank (9) is located within recess (15). A moveable cylindrical closure body (12) is guided in the longitudinal direction of housing (1) by the sides of recess (15) running in the flow direction.

The closure body (12) has a collar (16) around its circumference at its end facing intake (5), on which a notch (17) is connected in the flow direction. In this case, there is a spherical sealing area (18) at the end of closure body (12).

At the front side facing intake (5), closure body (12) is provided with a recess (23) to accommodate the locking spring (24) which almost completely houses locking spring (24) in the tensioned position, i.e. the open position, whereby the depth of recess (23) is determined such that the transverse plane (25) of the recess, serving as a support for locking spring (24), is located at the level of the sealing area (18) found at the external circumference of closure body (12).

The sides of the recesses (15), serving to guide closure body (12) are provided with a contour (19) which protrude into notch (17) of closure body (12). The collar (16) of the closure body (12) is supported on shoulder (20) created at each side in connection with the first free-cut (21). A second free-cut (22) found in contour (19) serves to accommodate the sealing area (18). (See FIG. 2).

The outlet (26), found in housing (1) in the axial elongation of intake (5), has a recess (27) serving to accommodate, for example by means of a molding fit, a ring-shaped seat (28) which has a sealing contour (29) in its axial opening matching that of sealing area (18) of closure body (12).

The mode of operation of the thermal safety device according to the invention is as follows:

When an undue temperature rise occurs, the meltable body (14) melts. Thereby clip (8), under tension due to its sprung shanks (9), together with its fixed part (13) presses against the inner wall (11) of housing (1). Due to splaying of clip (8) and the corresponding diameter enlargement, collar (16) of closure body (12) glides from the shoulders (20) and is pressed against sealing contour (29) of seat (28) by the force of locking spring (24) with its spherical sealing area (18).

During the closure movement, closure body (12) is guided in the axial direction by the contours (19) found in the shanks (9) of clip (8) so that radial deviations and their corresponding negative effects on sealing effectivity are avoided. The final closed position is shown in FIG. 4.

FIG. 6 shows a varied form of construction of the thermal safety device according to the invention. In order to keep closure body (12) in the open position, a somewhat U-shaped bent component (30) is found in extension (6). The connecting part (30) of the bent component (30) which joins the two shanks (9) supports itself with its end facing seat (7) on a lamellar and meltable body (14) matching the contours of the inner wall (11), which itself rests on the inner wall (11) of housing (1), whilst the connecting part (13) of the bent component which joins the shanks (9) is supported directly on the inner wall (11) with its end facing seat (28). Due to the lightly inclined position of the U-shaped bent component (30) compared with the longitudinal axis of housing (1), the two shanks (9) of the bent component (30) lie partly in the notch (17) area of the closure body (12) whereby at the same time they also lie under light pretension in the sealing area (18) of closure body (12).

Axially opposite the U-shaped bent component (30), a further L-shaped bent component (31) supports itself with one shank on the inner wall (11) whilst the other shank rests on seat (7). This shank, which preferably protrudes partly into intake (5) and within which is held by a light force fit, has a tongue (32) on its side facing the closure body (12) which in the open position protrudes into recess (23) of closure body (12) and forms a guide-way for locking spring (24).

When the meltable body (14) melts away, the shanks (9) of the bent component (30) ire no longer found within notch (17) of closure body (12), due to the corresponding change of position of bent component (30), but are parallel to the longitudinal axis of housing (1) so that the closure body (12) takes up its closed position due to the effect of locking spring (24). (See FIG. 8). Thereby the shanks (9) of the bent component (30) and the shanks of the bent component (31), supported on inner wall (11), form a guide-way for collar (16) and the sealing area (18) of closure body (12).

The thermal safety device according to the invention is self-evidently not limited to the given forms of construction. On the contrary, changes and modifications are possible without leaving the framework of the invention. Thus for example, the connections shown with an external thread can also have inner threads or flanges. Furthermore the spherically shaped sealing area (18) can be made conical for example. Moreover the number and shape of the bent components (30/31) can be changed or alternatively combined, for example two oppositely arranged U-shaped bent components (30) can be employed. Thereby it is possible to utilize not only one meltable body (14).

I claim:

1. A thermal safety device for automatically sealing fluid conduits in response to excessive temperatures comprising:
    a housing having a fluid flowpath therethrough and a seat at one end thereof,
    a closure member movably disposed within said housing, said closure member including a notch in a sidewall portion thereof,
    a biasing spring within said housing, said biasing spring being operative to urge said closure member into sealing engagement with said seat,
    a generally U-shaped bent component disposed within said fluid flowpath in said housing, said component including a portion received within said notch on said closure member whereby said component is operative to retain said closure member in spaced relationship to said seat, said biasing spring engaging said generally U-shaped bent component and said closure member,
    a meltable body disposed on an inner sidewall of said housing, said meltable body being operative to retain said portion of said component within said notch, said meltable body melting when said housing is subjected to an excessive temperature thereby allowing said portions to move out of said notch and said closure member to move into engagement with said seat to close off said fluid flowpath.

2. A thermal safety device for automatically sealing conduits in response to excessive temperatures comprising:
    a housing having a fluid flowpath therethrough and a seat at one end thereof,
    a closure member movably disposed within said housing, said closure member including a notch in a sidewall portion thereof,
    a biasing spring within said housing, said biasing spring being operative to urge said closure member into sealing engagement with said seat,
    a generally U-shaped bent component disposed within said fluid flowpath in said housing, said component including a portion received within said notch on said closure member whereby said component is operative to retain said closure member in spaced relationship to said seat, said generally U-shaped bent component holding said closure member in the open position including two sprung shanks having outward radially angular ends supported against an inner wall of said housing, said portions received in said notch being positioned on said shanks, a meltable body disposed on an inner sidewall of said housing, said meltable body being operative to retain said portion of said shank within said notch, said meltable body melting when said housing is subjected to an excessive temperature, thereby allowing said shanks of said component to splay out thus causing said portions to move out of said notch, due to the thereby corresponding change of position of said U-shaped bent component, so as to enable said closure member to move into engagement with said seat due to the effect of said biasing spring to thereby close off said fluid flowpath.

3. A thermal safety device for automatically sealing conduits according to claim 2, characterized in that one end of said biasing spring is supported on said bent component disposed within said housing.

4. A thermal safety device according to claim 2 wherein said closure member includes a recess having a bottom, said biasing spring being compressed against said bottom within said recess when said closure member is in said spaced relationship to said seat, said closure member including an annular sealing surface engageable with said seat, said bottom being positioned in a plane passing through said sealing surface.

5. A thermal safety device for automatically sealing conduits according to claim 4, characterized in that one end of said biasing spring is supported on said bent component disposed within said housing.

6. A thermal safety device according to claim 1 wherein said closure member includes a recess having a bottom, said biasing spring being compressed against said bottom within said recess when said closure member is in said spaced relationship to said seat, said closure member including an annular sealing surface engageable with said seat, said bottom being positioned in a plane passing through said sealing surface.

7. A thermal safety device according to claim 3 wherein said closure member includes a recess having a bottom, said biasing spring being compressed against said bottom within said recess when said closure member is in said spaced relationship to said seat, said closure member including an annular sealing surface engageable with said seat, said bottom being positioned in a plane passing through said sealing surface.

* * * * *